United States Patent
Revol (10) Patent No.: US 10,481,276 B2
(45) Date of Patent: Nov. 19, 2019

(54) POINT LOCATION METHOD FOR A VEHICLE MOVING ON A CONSTRAINED TRAJECTORY AND ASSOCIATED SYSTEM

(71) Applicant: THALES, Courbevoie (FR)

(72) Inventor: Marc Revol, Upie (FR)

(73) Assignee: THALES, Courbevoie (FR)

( * ) Notice: Subject to any disclaimer, the term of this patent is extended or adjusted under 35 U.S.C. 154(b) by 296 days.

(21) Appl. No.: 15/726,292

(22) Filed: Oct. 5, 2017

(65) Prior Publication Data

US 2018/0100934 A1 Apr. 12, 2018

(30) Foreign Application Priority Data

Oct. 6, 2016 (FR) ..................... 16 01449

(51) Int. Cl.
| | |
|---|---|
| *G01S 19/50* | (2010.01) |
| *G01C 22/02* | (2006.01) |
| *G01P 3/46* | (2006.01) |
| *H04W 64/00* | (2009.01) |

(52) U.S. Cl.
CPC .............. *G01S 19/50* (2013.01); *G01C 22/02* (2013.01); *G01P 3/465* (2013.01); *H04W 64/006* (2013.01)

(58) Field of Classification Search
CPC ......... G01S 19/50; G01C 22/02; G01P 3/465; H04W 64/006
USPC .................................................. 342/357.33
See application file for complete search history.

(56) References Cited

U.S. PATENT DOCUMENTS

| | | | |
|---|---|---|---|
| 5,375,059 A | 12/1994 | Kyrtsos et al. | |
| 2013/0126679 A1* | 5/2013 | Estkowski ........... | G08G 5/0013 244/190 |
| 2014/0172204 A1* | 6/2014 | Coulmeau ............ | G01C 23/005 701/14 |
| 2015/0172869 A1* | 6/2015 | Yang ....................... | G01S 5/02 455/456.1 |
| 2017/0082454 A1* | 3/2017 | Jurk ....................... | G01C 21/30 |
| 2017/0215166 A1* | 7/2017 | Disatnik ............... | H04W 64/006 |

FOREIGN PATENT DOCUMENTS

ES 2 418 929 A1 8/2013

* cited by examiner

*Primary Examiner* — Harry K Liu
(74) *Attorney, Agent, or Firm* — Baker & Hostetler LLP (57) ABSTRACT

A point location method for a vehicle moving on a constrained trajectory, implemented by a location device comprises tachometry means, odometry means, a group of at least one satellite geopositioning receiver and a time base synchronized to a satellite geopositioning system, the location device detecting the passage of the vehicle closest to a predetermined position by exploiting knowledge of the displacement of the vehicle, by predicting the form of a set of satellite geopositioning signals at the predetermined position and by testing the match between the predicted signals and those received by the group of at least one satellite geopositioning receiver, the displacement of the vehicle being determined from data supplied by the odometry means and a mapping of the trajectory.

6 Claims, 6 Drawing Sheets

POINT LOCATION METHOD FOR A VEHICLE MOVING ON A CONSTRAINED TRAJECTORY AND ASSOCIATED SYSTEM

CROSS-REFERENCE TO RELATED APPLICATION

This application claims priority to foreign French patent application No. FR 1601449, filed on Oct. 6, 2016, the disclosures of which are incorporated by reference in their entirety.

FIELD OF THE INVENTION

The present invention relates to the field of satellite geolocation. The invention relates more particularly to a method and a system for point location of a vehicle moving on a constrained trajectory of known route.

The present invention applies to any locomotion means moving on a constrained trajectory and its aim is to ensure a single shot geopositioning of this means at different points of its trajectory.

BACKGROUND

In the control and command systems of moving objects, of vehicles such as trains, it is necessary to have a reference marker with two objectives, to accurately and safely compute the control curves and to position the moving object. Indeed, if the train follows rails and therefore consequently has only a single degree of freedom, it is nevertheless necessary to give the driver the means of being accurately located during his or her travel along the rail line.

Currently, this location process uses a point information transmission technology comprising two components, namely a beacon on the ground, which is fixed (Eurobalise) and placed along the railway and an antenna embedded on board the moving object. The beacon on the ground is passive and contains, in a memory, its location references. Embedded on the train there is the antenna which has two functions, on the one hand the emission of a radiofrequency identification signal (or RFID for "Radio Frequency IDentification"), the aim of which is to transmit energy to the beacon when the moving object passes by the latter and, on the other hand, reception of the message emitted by the beacon with the energy emitted by the moving object. The passage of a train past one of these beacon therefore triggers the emission of a radiofrequency identification signal, which is detected and time stamped by a positioning system, embedded on board the train, and used to find out, in a point by point manner, the precise position of the train and thus readjust the on board location means, in particular the odometer embedded on board the train.

The drawback of this positioning system is that it constitutes a significant infrastructure burden. Indeed, this system requires the placement of RFID beacons approximately every two kilometres and, once installed, these beacons need to be serviced, which represents a high maintenance cost.

Also known is a project for improving this positioning system using, among other things, a satellite location device (or GNSS, for "Global Navigation Satellite System") embedded on board the vehicle and supplying a permanent and ongoing location (only in terms of position) as well as virtual beacons located at determined positions along the trajectory of the vehicle. The principle simply consists in tracking the position supplied by the GNSS receiver and in detecting the moment the vehicle arrives at the closest to the positions defined a priori which constitute said virtual beacons.

In a use linked to the rail domain, the location device is configured to trigger a "position pulse" equivalent to that of a Eurobalise, when the position supplied by the location device passes closest to the virtual beacon. This makes it possible to keep compatibility with the detection interfaces of the physical beacons defined by the standards of the European Train Control System (or ETCS).

One drawback of this system is that the radius of protection of the integrity of a GNSS positioning varies between 10 m and 50 m depending on the use or non-use of space augmentation systems such as differential GPS (or DGPS, for "Differential Global Positioning System") or SBAS (Satellite-Based Augmentation Systems), and according to the augmentation system (DGPS, SBAS, etc.) considered. With such a protection radius, it is difficult to respect the integrity performance objectives imposed by the standards which are less than 5 m and even lower, like the location capabilities of the systems based on the RFID beacons. Furthermore, the quality of the measurements can be degraded by the effect of propagation disturbances or local interferences in the reception environment.

Another drawback stems from the fact that the availability of the satellite positioning signals may be insufficient in the case of vehicles moving on the ground, for reasons of masking or of unavailability of the satellite signals. Thus, the accuracy and the integrity of the location measurements can be significantly worse than those supplied by a robust physical beacon.

SUMMARY OF THE INVENTION

One aim of the invention is in particular to correct all or part of the drawbacks of the prior art in GNSS positioning by proposing a solution that makes it possible to readjust a location device embedded on board a vehicle, with a reference system not requiring a physical beacon to be placed on its trajectory.

To this end, the subject of the invention is a point location method for a vehicle moving on a constrained trajectory of known route, said method being implemented by a location device comprising a tachometer, an odometer, at least one satellite geopositioning receiver receiving positioning signals from at least one satellite of a satellite geopositioning system and a local time base, measuring the current time, synchronized to the time base of said satellite geopositioning system. Said location device is configured to detect the passage of the vehicle closest to a predetermined position by exploiting knowledge of the movement of the vehicle, by predicting the form of a set of satellite geopositioning signals at and in proximity to the predetermined position and by testing the match between the predicted signals and those received by the group of at least one satellite geopositioning receiver, the movement of the vehicle being determined from data supplied by the odometer and from a mapping of the trajectory.

The point location method according to the invention to this end comprises:
  an estimation step during which use is made of the information on speed and position of the vehicle on its trajectory, supplied by the location device, to estimate, at the current time, the moment of passage closest to said predetermined position by taking account of the uncertainties on the time base of the location device;

an estimation step during which several possible moments of passage of the vehicle closest to the predetermined position are estimated, said possible moments bracketing the estimated moment of passage closest to said predetermined position;

an estimation step during which, for each of the possible moments, the estimation of the possible positions of the vehicle on the trajectory is performed for each of the possible moments of passage closest to the predetermined position by taking account of the uncertainties on speed of the vehicle and on position on the trajectory estimated at the current time and extrapolated to the estimated moment of passage of the vehicle closest to the predetermined position ($T_{cpa}$), said possible positions being included in a range of positions centred on the predetermined position;

a computation step, during which a prediction is made, for each of said possible positons of the vehicle, as to the form of a set of satellite geopositioning signals corresponding to the set of geopositioning signals expected for this position at the corresponding possible moment;

a spatial correlation step, during which, for each possible moment of passage of the vehicle closest to the predetermined position, the spatial match between the geopositioning signals received by the geopositioning receiver at the current time and the expected geopositioning signals is tested, by suitable filtering;

the estimated possible position for which the match is maximal being considered as the point of passage closest to the predetermined position and the corresponding current moment as the moment of passage closest to the determined positon.

According to a particular implementation of the location method according to the invention, the spatial match between the expected geopositioning signals and those received by the geopositioning receiver at each current time of the displacement is performed by applying a set of temporal correlation operations around each of the possible positons, or multiple correlation, said multiple correlation allowing the detection of a maximal correlation peak.

The position of passage and the current time for which, after spatial interpolation, the maximum correlation peak is detected, are considered as the point of passage and the moment of passage closest to the predetermined position.

According to a particular implementation, the location method according to the invention comprises an additional step of readjustment of the odometer of the location device embedded on board the vehicle, the readjustment being performed by considering the deviation between the position of the point of passage closest to the predetermined position and the position delivered by the odometer corresponding to the current time determined as being the moment of passage closest to the predetermined position.

Another subject of the invention is an embedded point location device for a vehicle moving on a constrained trajectory of known route configured to implement the location method according to the invention, said device comprising at least one tachometer configured to provide a signal representative of the speed of the vehicle, an odometer configured to provide a signal representative of the displacement of the vehicle, at least one geopositioning receiver configured to receive and process satellite geopositioning signals, a time base, measuring the current time, synchronized to the GNSS time via the geopositioning receiver, and at least one computation module configured to implement the method as described above by using the data supplied by the tachometry and odometry means and by the geopositioning receiver.

According to one embodiment, the point location device is configured to implement the point location method described previously when the distance between the vehicle and the predetermined position considered is below a predetermined value.

Another subject of the invention is a computer program product comprising computer-readable instructions which, when they are executed on a processor, cause the processor to execute the method described previously.

BRIEF DESCRIPTION OF THE DRAWINGS

Other particular features and advantages of the present invention will become more clearly apparent on reading the following description, given in an illustrative and nonlimiting manner, and with reference to the attached drawings, in which.

Hereinbelow, the term "virtual beacon" will be used to denote a predetermined position, or reference point, whose coordinates are accurately known.

Also hereinbelow, "current time" should be understood to mean the time measured by the local time base of the location device according to the invention.

Moreover, "odometer" should be understood here to mean any known measurement device that can be used to measure, at a given current time, a distance travelled by a moving object along a trajectory, a rail odometer for example in the case where the moving object is a train.

Similarly, "tachometer" should be understood here to mean any known measurement device that can be used to measure the speed of progress of a moving object along a trajectory, a rail tachometer for example in the case where the moving object is a train. The tachometer supplies the measurement of the current speed of the vehicle, that is to say the speed at the current time.

DETAILED DESCRIPTION

Preferentially but in a nonlimiting manner, the present invention is applicable in the railway domain for readjusting the odometric measurements performed on board the train engine. Generally, the invention can be applied to any locomotion means moving on a constrained trajectory, of known route, to ensure a point geopositioning at different points of its trajectory. Such can be the case, for example, in the maritime domain, for the positioning of ships in "navigation rails", for space navigation systems on fixed orbit or even, in the field of transportation for example, for the location of pooled transport vehicles, or to constitute a system for checking passages of a vehicle at mandatory positions, etc.

The point location method, according to the invention, exploits the fact that the vehicle that is to be located moves over a constrained trajectory whose route is known.

According to one embodiment, the different points of this route, or trajectory plan, can be stored in a memory area containing a database. This database can allow the vehicle to reconstruct its trajectory.

In this context, the geolocation of the vehicle is therefore limited to a search with one dimension: time. The reference points through which the vehicle will pass are known but the time at which the vehicle will pass at these points is, for its part, unknown.

Hereinbelow, it will be assumed that the vehicle that is to be located has an embedded location device comprising means for measuring the speed of displacement of the vehicle (tachometer) and means for positioning based on odometric measurements (odometer). The location device is therefore capable of estimating, at any time, the current position of the vehicle and the uncertainty on position on the curvilinear trajectory which is associated with it as well as the current speed of the vehicle and an estimation of the error on the current speed.

As an example, in the railway domain, it is known that this type of distance measurement performed by odometer drifts rapidly, by about 5% to 10%, of the distance travelled, and therefore needs to be regularly readjusted in order to accurately know the position of the motor of the train during its displacement.

To readjust the measurements of position of a vehicle moving along a well defined trajectory, the method according to the invention uses virtual beacons marked along the route of the vehicle and seeks to accurately know the moment of passage of the vehicle closest to one or other of these beacons.

The virtual beacons consist of marker points with fully known positions, which the vehicle passes when it travels along its route.

These beacons can be distributed regularly or irregularly along the route of the vehicle. According to a particular embodiment, the virtual beacons can be spaced apart by approximately two kilometres. On each passage closest to a virtual beacon, the (time of passage, reference position) pairing detected is taken into account by the odometer in order to correct its drift in time.

The point location method according to the invention consists in detecting the passage of a vehicle closest to reference points, using a satellite positioning system (or GNSS for "Global Navigation Satellite System"), like the GPS, Galileo or Glonass systems or any other equivalent system, by exploiting knowledge of the displacement of the vehicle and by predicting the form of a set of satellite geopositioning signals in a range of positions around the reference point considered.

The invention thus performs, in a point by point manner, a synchronization in time and in position of the measurement means embedded on board the vehicle, by comparing the position of the vehicle determined by said measurement means on passing closest to the reference point considered and the real position of this reference point.

The moment of passage closest to the reference point (virtual beacon) considered is determined as follows:

at a current time or prediction time, the moment of passage closest to the reference point considered is predicted, this moment of passage being determined from measurements delivered by the embedded measurement means;

a certain number of possible moments of passage are defined, contained within a determined time range centred on the predicted moment;

for each possible moment of passage, a certain number of possible positions on the trajectory of the vehicle are defined, these possible positions being defined in a position range around the position corresponding to the possible moment considered, determined from the position of the vehicle on its trajectory at the prediction time and from the estimation of the speed supplied by the tachometer at this prediction time;

for each possible moment and each possible position, the expected GNSS signals are determined;

on passing over each of the duly determined possible positions, the match is measured between the expected GNSS signals and the GNSS signals received using an embedded GNSS receiver.

Hereinafter, the possible position, measured by the embedded means, for which the match is maximal, is considered as the position of the vehicle closest to the reference point considered, and the corresponding measured time as the moment of passage closest to this point.

To this end, the location device comprises at least one GNSS signal receiver for the synchronization of its local time (current system time) to the time of the GNSS system. Reference is made to an uncertainty on the time of a few hundred nanoseconds. As a reminder, an uncertainty of 1 μs corresponds to approximately 300 m of uncertainty linked to the time.

Thus, advantageously, the geopositioning of the vehicle is not performed continuously, but in a point by point manner. It is performed only in the vicinity of the positions of installation of the virtual beacons, at the moment of passage of the vehicle in proximity to these positons. There is no need for it to be performed outside of these reference points.

One advantage linked to the point by point and momentary use of the GNSS signals at only the moments of passage in proximity to the predefined positions of the beacons consists in a reduction of the time of exposure to any GNSS signal defects, which makes it possible to reinforce the integrity of the location method.

Another advantage, linked to the search for the best spatial adaptation by displacement of the moving object, lies in the decorrelation of the biases associated with the reflected multiple paths (from one reception position to another) to which the GNSS signals may be subject, which reduces the risk of the existence of a stable bias throughout the spatial correlation function which would lead to a bias on the determination of the position of the maximum correlation peak.

Contrary to a conventional method consisting in performing, by suitable filtering, a time synchronization of the satellite signals received by exploration of the range of the propagation delays, corresponding to the range of positon uncertainty, the invention uses an approach based on a principle of "look-out detection" for the GNSS signals, purely dedicated to the detection of the passage of the vehicle at a reference position.

The principle consists in predicting a moment of passage of the vehicle at a particular point and in performing a synchronization in position by intercorrelation of the pseudo-random codes of the satellite geopositioning signals.

Figure 1:
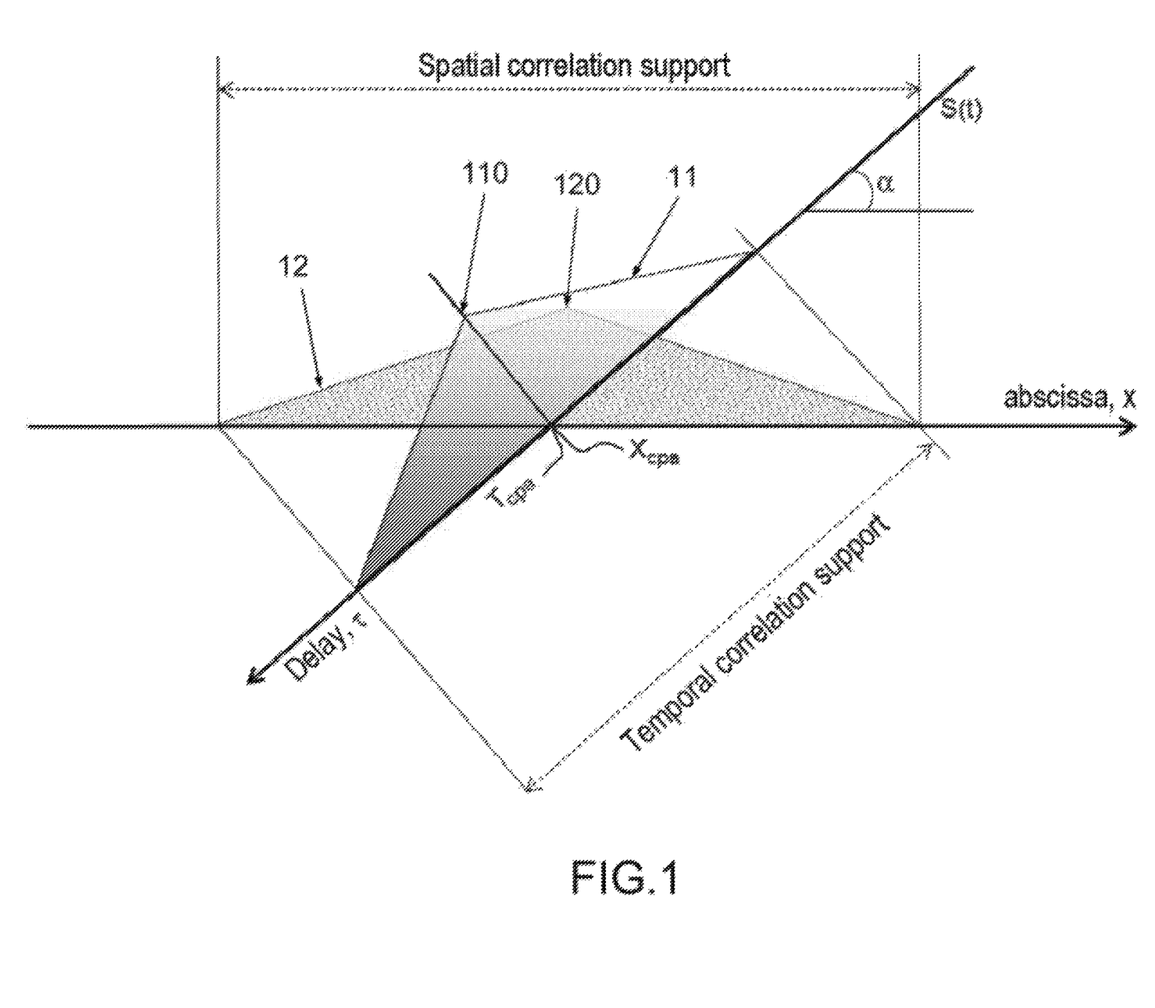
FIG. 1 illustrates the relationship between the temporal correlation and the spatial correlation.

FIG. 1 illustrates the equivalence between the synchronization in time by temporal correlation and the synchronization in position by spatial correlation. This figure shows a graphic representation, as a function of time, of a temporal correlation function 11 of the signal received from a geopositioning satellite with the signal expected at an abscissa point $X_{cpa}$ and at an moment of passage $T_{cpa}$ closest to a virtual beacon.

The support $T_{corr}$ of this temporal correlation function corresponds to a code chip (term used in the GNSS techniques, as distinct from a bit which is used to define an information unit), i.e. 1 µs for the GPS system. The maximum 110 of this temporal correlation function is obtained at the time of synchronization of the expected signal with the signal received. It indicates the moment of passage closest to the virtual beacon.

FIG. 1 presents also a graphic representation, as a function of the curvilinear abscissa, of an equivalent spatial correlation function 12 of the signal received from a geopositioning satellite with the signal expected at an abscissa point $X_{cpa}$ and at an moment of passage $T_{cpa}$ closest to a virtual beacon.

The support $X_{corr}$ of this spatial correlation function corresponds to the projection of the temporal correlation support on the displacement axis. It can be given by the formula:

$$X_{corr} = c \cdot T_{corr}/\cos(\alpha)$$

in which $X_{corr}$ represents the support of the spatial correlation function;

c represents the speed of light;

$T_{corr}$ represents the support of the temporal correlation function;

α represents the angle of incidence of the satellite signal relative to the direction of displacement of the vehicle;

the operator "." represents the multiplication sign.

The maximum 120 of this function corresponds to the abscissa of synchronization of the expected signal with the signal received, it indicates the position closest to the virtual beacon.

Figure 2:
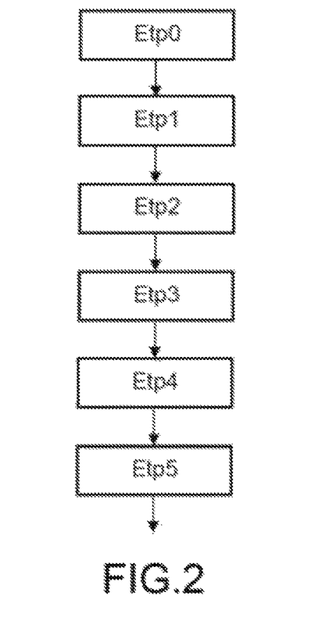
FIG. 2 represents possible steps of the location method according to the invention.

FIG. 2 represents a flow diagram illustrating possible steps of an exemplary implementation of the point location method for a vehicle moving on a constrained trajectory according to the invention.

The method thus comprises a step Etp0 of estimation, at the current time considered, of an estimated moment of passage of the vehicle closest to a predetermined position (reference point) or virtual beacon. The estimation of this time is performed using the location device at the current time, based on the speed of the vehicle measured at the current time and on the distance separating the position of the vehicle at the current time from the predetermined position.

In order to take account of the uncertainties on the time base of the receiver of the location device, the method also comprises a step Etp1 of estimation of several possible moments of passage of the vehicle closest to the predetermined position. These estimated possible moments are contained within a time range around said estimated moment of passage closest to the predetermined position.

This step can, for example, be performed by a computation module of the location device.

The method also comprises a step Etp2 of estimation of the range of the possible positions of the vehicle for each of the possible moments of passage which takes account of the uncertainties on position and of speed of the vehicle at the current time and extrapolated to the estimated moment of passage of the vehicle closest to the virtual beacon considered, said possible positions being included in a range of positions centred on the position of the beacon considered.

This step can also be, for example, performed by a computation module of the location device.

The method also comprises a step Etp3, during which a prediction is made, for each of the possible positions of the vehicle determined in the preceding step, as to the form of a set of satellite geopositioning signals corresponding to the set of geopositioning signals expected for the possible position considered at the corresponding possible moment of passage of the vehicle closest to the next virtual beacon.

This step can also be, for example, performed by a computation module of the location device.

The method also comprises a step Etp4, during which, for each possible moment of passage closest to the virtual beacon considered, the match of the geopositioning signals received by the GNSS receiver of the point location device with the predicted geopositioning signals associated with each possible position of the vehicle is computed in current time, by temporal correlation.

The correlation peak obtained makes it possible to determine the current time of best match for the possible position considered.

The method according to the invention finally comprises a step Etp5, during which the peak maximum amplitude is determined from among the correlation peaks determined for each of the possible positions, the current time for which this peak maximum amplitude with is obtained corresponding to the moment of passage closest to the predetermined position.

These different steps will now be developed with reference to FIGS. 3 to 6.

Figure 3:
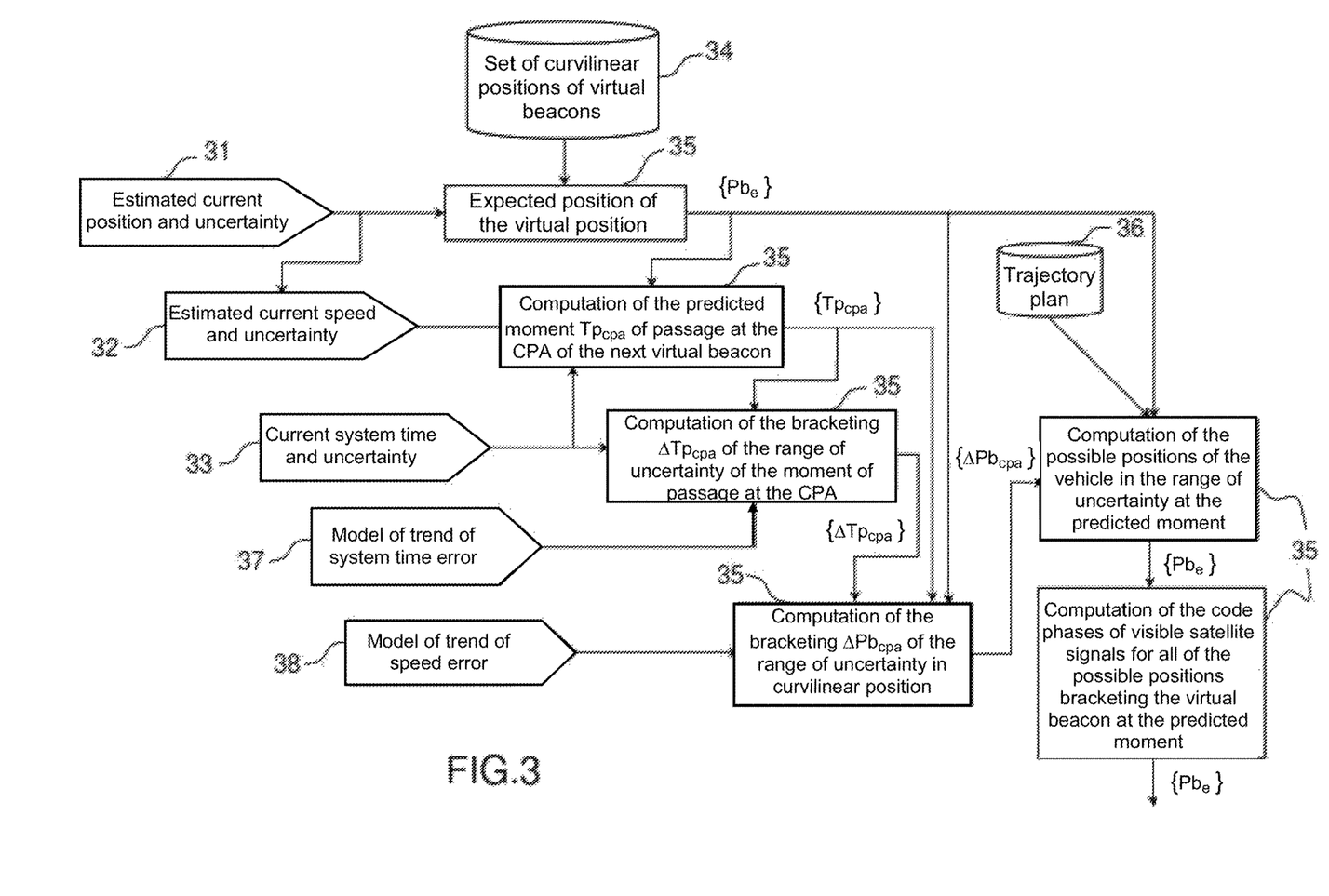
FIG. 3 illustrates an exemplary implementation of the prediction of the phases of the codes expected at the group of possible positions of the vehicle closest to a virtual beacon.

Referring to FIG. 3, throughout the displacement of the vehicle, the embedded tachometer 32 and odometer 31 supply the location device with signals representative of the current speed and of the displacement of the vehicle along its route. From these data and as a function of the positions of the different virtual beacons, a computation module 35 of the location device evaluates the distance which separates the vehicle from the next virtual beacon.

The position of the different virtual beacons along the curvilinear trajectory of the vehicle and the order in which these beacons will be crossed can, for example, be stored in a given area of the memory 34 of the location device.

Alternatively, according to a variant implementation of the method, such information can be transmitted to the location device via any appropriate communication means known to those skilled in the art.

Knowing the current speed of the vehicle, a computation module 35 of the location device can extrapolate an estimated moment $Tp_{cpa}$ of passage closest to the next virtual beacon on its trajectory.

A first problem arises because the local time 33 of the vehicle that is to be located (i.e. the current time) is not perfectly synchronized with the time of the GNSS system.

As an example, if an offset of 1 µs is considered between the local clock 33 of the geopositioning receiver and the time base of the satellites of the GNSS system, this desynchronization generates a computation error on the position of the vehicle of 300 m.

This is why, in order to take account of this uncertainty on the clock of the GNSS signal receiver, a range of uncertainty $\Delta Tp_{cpa}$ is defined around $Tp_{cpa}$ and this range is sampled. The different samples will correspond to different GNSS signal reception time assumptions in order to take account of different assumptions of synchronization of the local clock 33 with the time base of the GNSS system.

The range of uncertainty consisting of the time range $\Delta Tp_{cpa}$ can be determined for example using a model of evolution of the error of the system time, that is to say of the local clock 33 of the receiver of the location device. This model can for example be stored in a given area of the memory 37 of the location device.

Several possible moments of passage of the vehicle closest to the predetermined position are therefore determined. These possible moments of passage are determined around the estimated moments $Tp_{cpa}$ of passage closest to the virtual beacon considered.

As an illustration, the temporal range of uncertainty $\Delta Tp_{cpa}$ can for example be sampled by taking ten samples, which corresponds, if a range of uncertainty of 1 μs is considered, to an assumption of synchronization to within 0.1 μs.

Another problem stems from the fact that the signal representative of the speed of the vehicle supplied by the tachometer is affected by uncertainties just like the signal representative of the displacement of the vehicle along its trajectory supplied by the odometer between the position of the vehicle upon the last readjustment of the odometer and its current position. Furthermore, to determine the estimated moment $Tp_{cpa}$ of passage closest to the next virtual beacon, the location device uses the current speed of the vehicle, which adds an extra uncertainty to the estimated moment of passage closest to the next virtual beacon.

Because of these uncertainties, at the moment of passage estimated by the positioning device, the vehicle will perhaps not be at the position of the virtual beacon but either before or after this position.

In order to take account of this error on the estimated moment of passage closest to the virtual beacon, the positioning device does not estimate a position but a bracketing of the position of the vehicle around the position of the virtual beacon, at the estimated moment of passage $Tp_{cpa}$. This spatial bracketing, or range of uncertainty, is a function of the uncertainties on the speed of the vehicle and its position at the time when the estimated moment of passage closest to the next beacon is extrapolated and of the uncertainty on the future speed of the vehicle between the position at the time when said estimated moment is extrapolated and the position of the next virtual beacon.

It should be noted that the computation modules 35 described can be one and the same module or separate modules.

The positioning device therefore estimates, for each of the possible moments of passage of the vehicle closest to the predetermined position considered, during a step Etp2 of the point location method, a set of possible positions Be of the vehicle, around the position corresponding to the possible moment considered, with account taken of all of the uncertainties considered.

As a nonlimiting example, it is possible to consider a range of uncertainty on curvilinear abscissa $\Delta Pb_{cpa}$ of approximately 500 m around the position of the virtual beacon. In the time domain, that is reflected by an uncertainty of approximately 5 s for a vehicle moving at 100 m/s (360 km/h) on its curvilinear abscissa.

The range of uncertainty on curvilinear abscissa $\Delta Pb_{cpa}$ can be determined for example using a model of evolution of the error of the speed of the vehicle that is to be located. This model can for example be stored in a given area 38 of the memory of the location device.

The number of possible positions Be of the vehicle and their locations can be defined so as to bracket the range of position uncertainty along the curvilinear abscissa of the trajectory and so as to sample, sufficiently finely, the spatial correlation range (correlation domain). The spacing between the expected possible positions can be chosen such that the spatial correlation samples are separated by less than one code chip (i.e. 300 m for the C/A code of the GPS system), so as to be able to reconstruct, by interpolation, the precise position of the maximum of the correlation function on the trajectory of the vehicle.

As a reminder, the C/A (Coarse Acquisition) acquisition code is a digital signal made up of 1023 chips (term used in the GNSS techniques, as distinct from a bit which is used to define an information unit) and which is repeated every millisecond.

As an illustration, it is possible to retain a spacing of the samples of 0.2 chip (i.e. 60 m for the GPS system). If a spatial range of uncertainty of 500 m is considered around a virtual beacon, this entails computing in parallel 500/60, i.e. approximately 83, virtual positions. Each position is delayed or advanced by approximately k.0.2 cos(α) ps relative to the possible moment of passage considered (k representing the index of the possible position in relation to the location of the virtual beacon, α representing the angle of incidence of the signal in relation to the direction of displacement at each position and "." representing the multiplying operator).

Advantageously, the uncertainty on the moment of passage of the vehicle at a given reference point is transformed into an uncertainty on position around the virtual beacon at the estimated moment of passage.

Once the possible moments of passage of the vehicle closest to the predetermined position considered and the possible positions Be of the vehicle for each possible moment of passage around the estimated moment $Tp_{cpa}$ have been determined, it is possible to predetermine the phases of codes $Pd_{Be}$ from each satellite received at each location of the possible positions of the vehicle and for each of the possible moments of passage closest to the virtual beacon, through the estimation of the distances between each geopositioning satellite and each possible position of the vehicle.

The position of the visible geopositioning satellites can be computed through ephemerides.

Thus, for each of the possible positions of the vehicle at each of the possible moments, and for each of the visible geopositioning satellites at each possible position of the vehicle, a computation module of the positioning device estimates, during a step Etp3, all of the satellite geopositioning signals expected, as will be received for each possible position considered and for each possible moment of passage of the vehicle at the virtual beacon.

Since the geopositioning signals are deterministic, it is possible to anticipate the sequence of the signal (code delay, position of the satellites, Doppler channel) for each of the satellites which will be visible at the position considered and at the estimated moment of passage of the vehicle. These different signals can be stored in a given area of the memory of the location device in order to prepare it for receiving these signals from the geopositioning satellites when the vehicle approaches the virtual beacon considered.

The generation of the local satellite codes, at the current time, can, for example, be performed using numerically controlled oscillators (or NCO) driven based on the code phase expected at the moment $Tp_{cpa}$, for each of the signals received on each of the possible positions of the vehicle at the predicted moment.

According to a particular feature of the invention, the detection of the position of the vehicle is performed, as has been stated previously, by a "look-out detection" of geopositioning signals. As stated previously, all of the geopositioning signals expected, for each of the possible positions of the vehicle for each possible moment and for each of the geopositioning satellites visible at each of these possible positions, are stored in a given area of the memory of the location device and are compared to the signals received by the GNSS receiver of the positioning device during the displacement of the vehicle along its route.

Consequently, all the signals from the geopositioning satellites visible from the vehicle having been prepared with the correct offset, there will be only one point of the trajectory of the vehicle for which all will be synchronized at the same time. The knowledge of the position of this point will make it possible to readjust the location device embedded on board the vehicle.

The group of possible positions of the vehicle for each of the possible moments of passage closest to the virtual moment considered will make it possible to sample several curvilinear correlation functions between the GNSS signals received by the GNSS receiver or receivers of the location device during the passage of the vehicle in these spatial and temporal ranges of uncertainty, and the satellite signals expected at each of the possible positions of the vehicle, and for each of the possible moments of passage closest to the virtual beacon considered.

Figure 4:
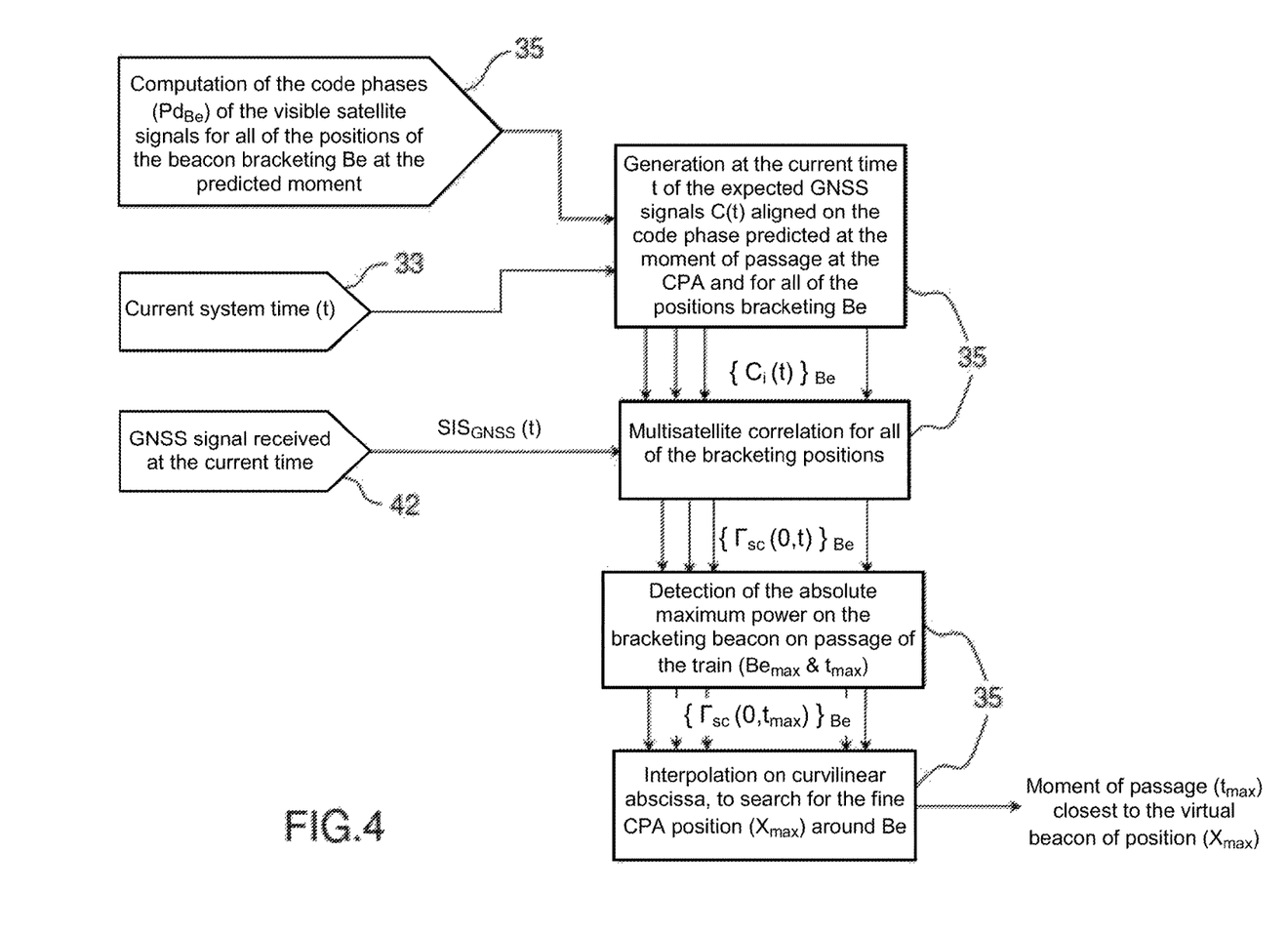
FIG. 4 illustrates an exemplary implementation of the detection of the moment of passage of the vehicle closest to a virtual beacon.

FIG. 4 illustrates an example of implementation of the detection of the moment of passage of the vehicle closest to a virtual beacon. In order not to overload the figure, only a single possible moment of passage closest to the virtual beacon is considered.

The principle consists in performing a continuous suitable filtering between the satellite geopositioning signals received by a GNSS receiver of the location device and a set of local codes from the visible satellites, synchronized on the phases of the code and of the carrier expected from the geopositioning signals at the possible moment of passage closest to the virtual beacon considered and for each of the possible positions of the vehicle corresponding to this possible moment.

For each of the possible positons Be of the vehicle, a computation module 35 of the point location device generates, at the current time t, the expected geopositioning signals Ci(t) aligned on the phase predicted at the possible moment of passage of the vehicle closest to the virtual beacon considered. For this purpose, the computation module 35 can use, for each of the possible positions, a time base 33 synchronized to the time of the GNSS system as well as the results of computation of the code phases Pd of each of the GNSS signals from the satellites visible at the possible position considered.

These results can be supplied by a computation module, as represented in FIG. 4, or be read in a dedicated area of the memory of the device.

If the general case is considered in which several possible moments are predicted, the operations presented previously are performed in parallel for each of the possible moments of passage closest to the virtual beacon considered.

For each of the possible moments and at each possible position of the vehicle, the expected geopositioning signals $\{Ci(t)\}_{be}$ associated with the possible moment of passage closest to the virtual beacon considered and each visible geopositioning satellite are then correlated with the geopositioning signals $SIS_{GNSS}$ received by the GNSS receiver 42 of the positioning device during the displacement of the vehicle along its trajectory during a step Etp4 of spatial correlation.

Advantageously, the correlation of the geopositioning signals is a global correlation taking into account, simultaneously, the signals received from several geopositioning satellites visible from the possible positon considered.

According to a preferred implementation, the correlation uses the signals of all of the geopositioning satellites visible from the possible position considered. This multisatellite correlation is possible because, since the vehicle moves on a constrained trajectory, the search is conducted in a single dimension. It is known that when the vehicle passes by the position of the virtual beacon, all the signals from the visible geopositioning satellites will exhibit the maximum of the correlation function at the same time. The benefit of this global correlation is that, by aggregating the signals, the method gains in accuracy and therefore in robustness.

Another advantage of this global spatial correlation is that it makes it possible to benefit from a better robustness with respect to the specular multiple paths compared to a single-satellite correlation.

For each of the possible positions of the vehicle and for each of the possible moments of passage closest to the virtual beacon, the output signals from the correlators are summed incoherently. Indeed, since the coherence of the carrier phase is not assured with sufficient accuracy, because of random propagation factors (for example because of the ionospheric delays, the multiple paths, etc.), it is advisable not to perform coherent summings of the correlation outputs of the different satellites of one and the same position. Since the residual errors on the code, after correction of the delays deriving from the models, are minor in relation to the correlation support, they do not significantly impact the value of the correlation function and can be summed quadratically.

Figure 5:
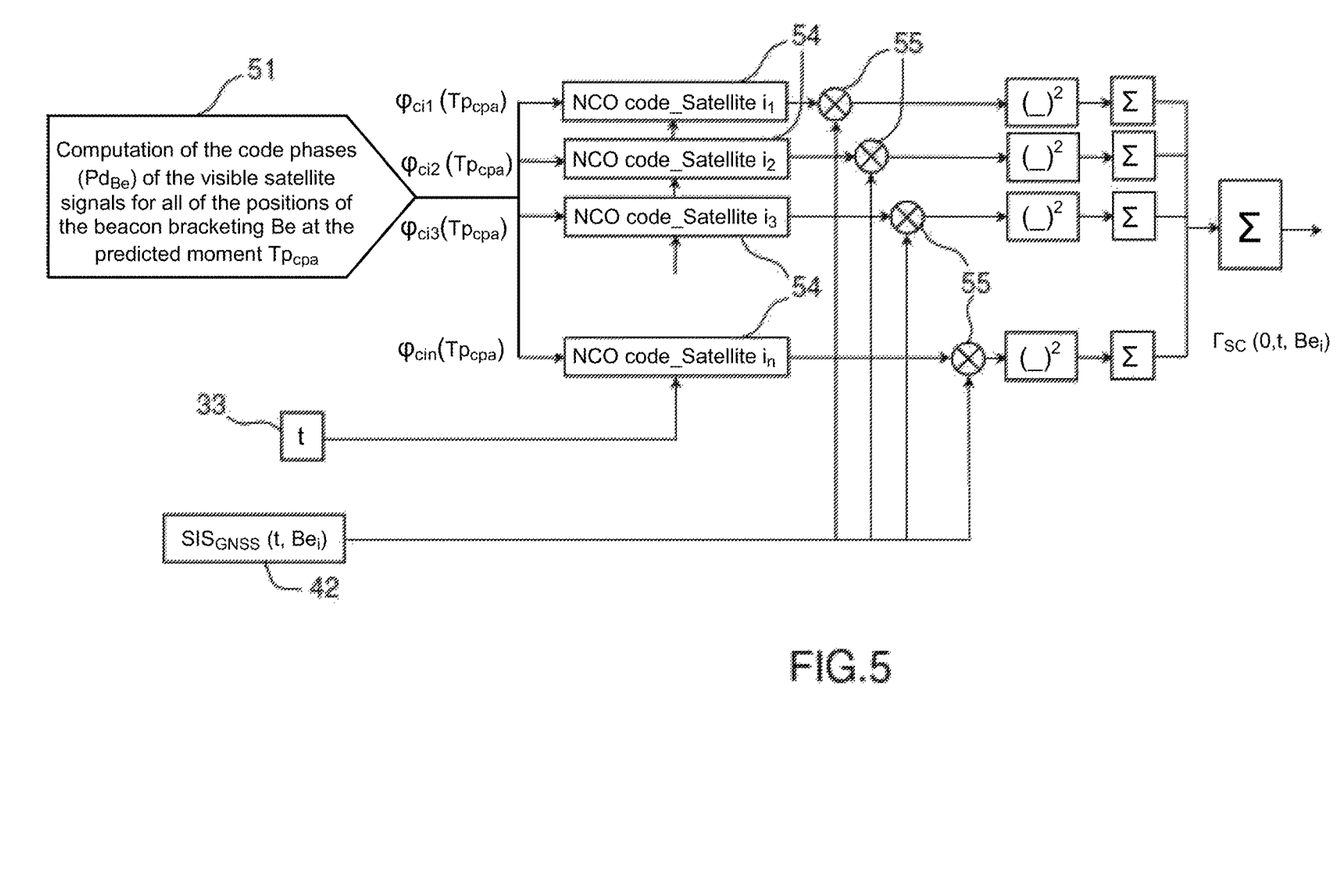
FIG. 5 illustrates the multisatellite correlation principle for a given virtual beacon position.

As an illustration, FIG. 5 represents an example of possible implementation of the processing of simultaneous multisatellite correlation for a possible position of the vehicle $Be_i$ (the index i representing the rank of the position) at a possible moment of passage closest to a virtual beacon. The processing is applied to each of the signals received by the receiver 42 of the location device from the satellites taken into account and visible from the possible position considered. These satellite signals will provide as many spatial correlation functions along the curvilinear displacement of the vehicle as there are visible geopositioning satellites taken into account.

The code phases of the signals expected from each visible satellite taken into account from the possible position considered, estimated during the step Etp3 of the location method and for example stored in a memory area 51, can be generated by numerically controlled oscillators 54 synchronized by a time base or local clock 33. The output signals of these oscillators 54 are correlated with the satellite signals received by the GNSS receiver 42 of the point location device using correlators 55.

The correlation functions thus obtained for the different satellites visible from the possible position considered are then accumulated quadratically.

Referring to FIG. 4, at the end of the multisatellite correlation, several global correlation functions $\{\Gamma_{sc}(0,t)\}_{Be}$ are obtained, computed at the different possible positions Be of the vehicle and at the different possible moments in the spatial and temporal search range for the position of the virtual beacon.

As the vehicle moves, a computation module of the location device tracks the trend of each correlation function in order to detect its maximum. The search for the instantaneous maximum of each correlation function according to the abscissae is performed at each time of computation of the correlation functions for each possible position of the vehicle and each possible moment from the moment when the distance between the vehicle and the next virtual beacon is less than a predetermined value.

According to one implementation, the computation of the correlation functions can be performed from the moment when the vehicle enters into the range of spatial indeterminacy of the positon of the virtual beacon.

According to a particular feature of the method according to the invention, the location device does not search for the maximum of the correlation function satellite-by-satellite but performs an aggregate multisatellite correlation, that is to say a simultaneous correlation of all the geopositioning signals from the satellites visible for each of the possible positions of the vehicle and each of the possible moments of passage closest to the virtual beacon.

A computation module of the location device conducts in parallel several suitable filterings corresponding to the signals to be received at the different possible positions of the vehicle in relation to the virtual beacon, computed for each possible time expected on the plan of the trajectory of the vehicle.

The location of the position of the vehicle at the predicted moment is performed by the detection of the absolute maximum power of all of the global correlation functions over the different possible positions bracketing the location of the virtual beacon and the different possible moments bracketing the predicted moment $Tp_{cpa}$, during a step Etp5 of the point location method.

After detection of this absolute maximum, the computation module has access to the time $T_{max}$ of passage closest to the virtual beacon considered and can compute, by interpolation, the precise position $X_{max}$ of the maximum of correlation according to the curvilinear abscissa, from the temporal correlation maxima obtained at the different expected positions, distributed along the trajectory.

Figure 6:
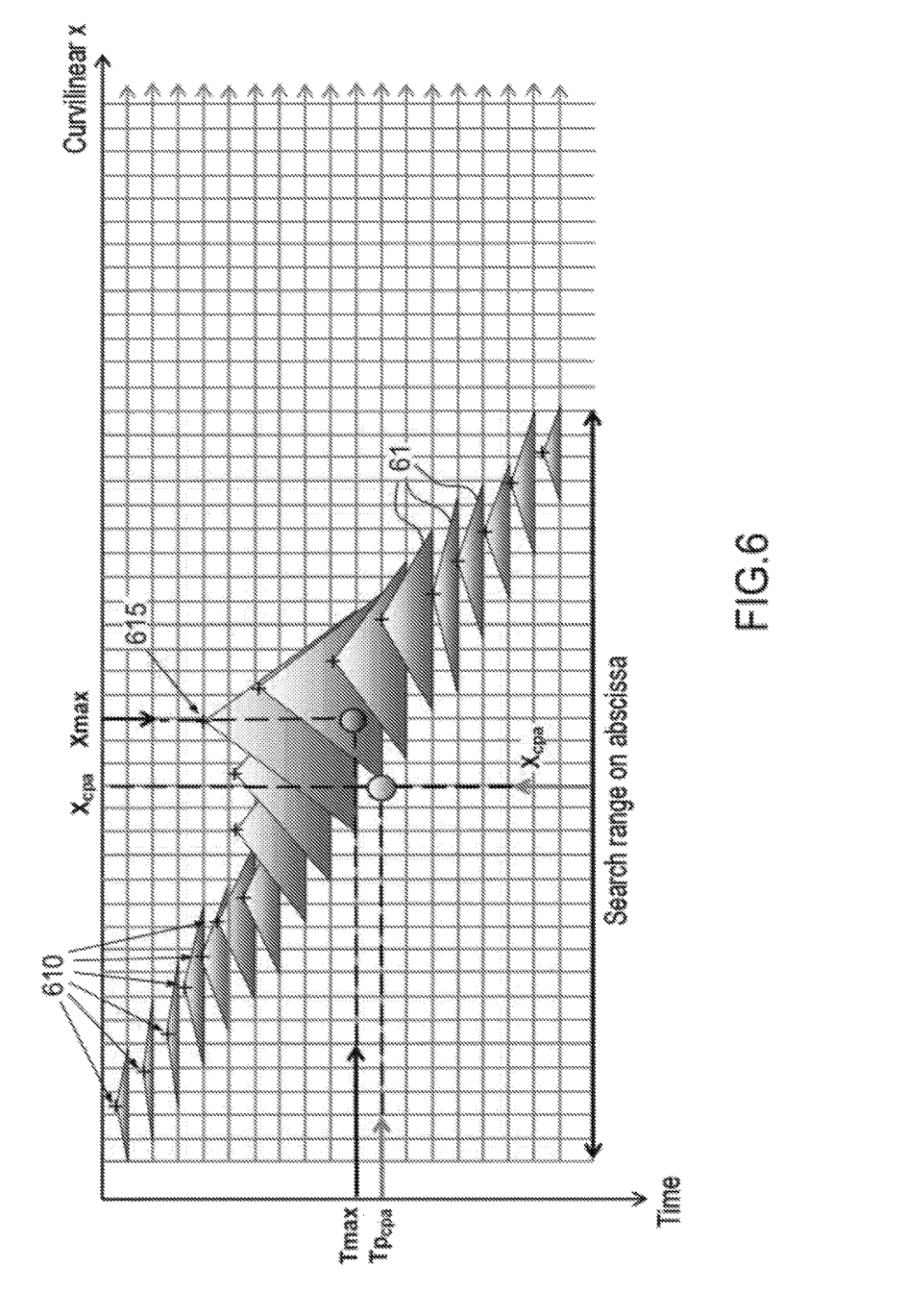
FIG. 6 illustrates the principle of detection of the position and of the moment of passage closest to a virtual beacon.

As an illustration, FIG. 6 presents an example of a result obtained by applying the method according to the invention and illustrates the principle of determination of the position and of the moment of passage closest to a virtual beacon.

This figure represents the trend of the multisatellite correlation functions 61 as a function of time for each possible position of the vehicle and for the possible moment corresponding to the best assumption of synchronization of the local clock 33 of the positioning device with the time base of the GNSS system.

It is assumed that, for each possible position of the vehicle at the possible moment of passage closest to the position $X_{cpa}$ of the virtual beacon considered, a computation module of the positioning device has predetermined the geopositioning signals expected.

When the vehicle enters into the search range for the position of the virtual beacon, the location device will implement the point location method.

As the vehicle advances, each correlation function 61, computed at the different possible positions of the vehicle, will increase, go through an instantaneous maximum 610 or correlation peak, then decrease. The location device is presynchronized to the GNSS signal expected at each possible positon and it is the displacement of the vehicle which causes the correlation function to change.

Out of all these correlation peaks, only one is perfectly suited and reaches an absolute maximum of amplitude 615. It indicates the point for which the GNSS signal is perfectly synchronized with the predicted signal. For the other points, the GNSS signals received are offset relative to the expected signals and therefore pass through an instantaneous maximum 610 which is not the absolute maximum 615.

Once the absolute maximum is detected, a computation module of the positioning device can deduce the time of passage $T_{max}$ closest to the virtual beacon considered and the curvilinear abscissa $X_{max}$ closest to this beacon. In fact, this absolute maximum 615 is observed for a position which is not the predetermined position, which means that the assumptions which had been made at the outset were not exact.

The position deviation that is observed is a result of the initial position error and of the extrapolation error and allows the point location device to readjust the odometry means on boad the vehicle.

It should be noted that, since the computation module has to track all the correlation functions in order to detect the absolute maximum 615, this detection is not performed at the current time but is performed once the search range for the virtual beacon has been crossed and therefore once the curvilinear abscissa $X_{max}$ closest to the virtual beacon considered has been passed. The readjustment of the odometry means on board the vehicle is not therefore performed at the moment of the passage by the virtual beacon, but later.

Since the range of spatial correlation of the satellite geopositioning signals is of the order of 300 m (for the GPS system) and depends on the incidence of the GNSS signals, the positioning device can reconstruct the precise position of the correlation maximum along the curvilinear abscissa by interpolation of the levels of correlations estimated over all of the possible positions Be of the vehicle at the moment of passage closest to the virtual beacon. The scanning time of the correlation function is a function of the speed and the direction of displacement of the vehicle.

As an example, if a vehicle is considered that is moving at 100 m/s, for the GPS system with the C/A code, the maximum time is 300/100, or 3 s for a satellite in the axis of displacement of the vehicle (with the maximum contrast on the correlation function). This time increases by $1/\cos(\alpha)$ of the angle of incidence a of the geopositioning satellite in relation to the displacement, commensurately reducing the contrast of the correlation function.

The range of spatial correlation depends therefore on the direction of incidence of the GNSS signal in relation to the axis of displacement of the vehicle.

The signals that are "orthogonal" to the displacement cannot be used to solve the position indeterminacy, so it may be possible to define the equivalent of a dilution of precision (or DOP) coefficient to evaluate the capacity to use the virtual beacon as "absolute reference" by taking account of the geometry of the satellites.

As a reminder, for a standard resolution in all three dimensions, for that purpose, a matrix of the directing cosines of the angles of arrival, which in fact enter into the equation system to be solved is used.

In the case of a one-dimensional resolution, a strict equivalent criterion can be constructed. This criterion can have the form:

$$DOP = 1/N \, \Sigma_i 1/\cos(\alpha_i)$$

in which: DOP represents the equivalent criterion,

N represents the number of positioning satellites in view,
$\alpha_i$ represents the angle of arrival of the $i^{th}$ satellite, i being an index varying from 1 to N.

It is for example possible to limit the satellites taken into account to those which exhibit an angle of incidence in relation to the direction of displacement of less than 60°, which corresponds to a maximum elongation of the correlation support by a factor of 2.

Figure 7:
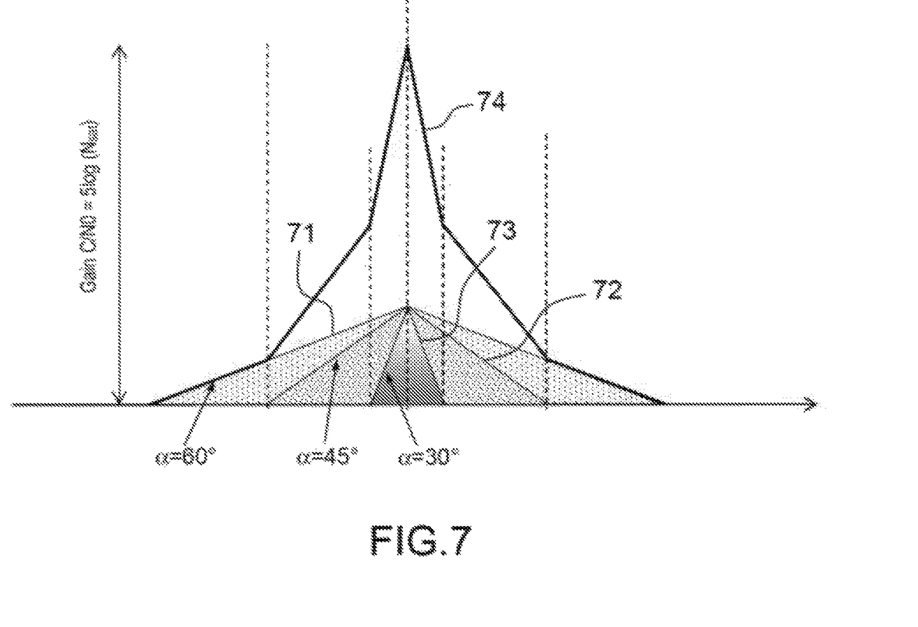
FIG. 7 represents an example of result obtained after quadratic summing of satellite spatial correlation functions with different incidence.

As an illustration, FIG. 7 represents an example of a result obtained after quadratic summing of satellite spatial correlation functions at different incidences. The curves 71 to 73 are respectively graphic representations of correlation functions for an angle of incidence of the satellite signal in relation to the direction of displacement of 60°, 45° and 30°. The curve 74 is the graphic representation of the aggregate of the satellite correlation functions.

According to a particular implementation, the coherent integration time can be chosen between approximately 10 ms and approximately 20 ms, i.e. a temporal sampling of approximately 100 Hz. If a vehicle is considered that is moving at 100 m/s, this sampling leads to an uncertainty of approximately 1 m, which is negligible compared to the correlation support (as a reminder, the correlation support for the C/A code of the GPS system is approximately 300 m).

It is assumed that the standard signal-to-noise ratio of a GPS signal, in a noise band of 1 Hz, is 42 dB/Hz. If a coherent integration time of 20 ms (i.e. 50 Hz of noise bandwidth) is considered, the noise level is multiplied by 50, i.e. a reduction of the signal-to-noise ratio (CNO) equal to 10log(50), i.e. 17 dB.

Furthermore, the non-coherent accumulations of the correlation functions of the $N_{sat}$ satellites at the maximum point of the correlation function adds a term equal to $10.\log.N_{sat}$, $N_{sat}$ representing the number of visible geopositioning satellites considered.

The signal-to-noise ratio is therefore of the order of $42-17+10.\log.N_{sat}$, i.e. $25\ dB+10.\log.N_{sat}$, which leads to an uncertainty on the position resolution of the order of a metre regarding the position of the correlation peak representing the absolute maximum (once the axes with unfavourable views have been eliminated). This uncertainty is to be compared to the errors of several tens of metres in a standard positioning.

According to another implementation, the correlation functions can be weighted by taking account of the axes with geometric view. Advantageously, that makes it possible to reinforce the signal-to-noise ratio of $5.\log(N_{sat})$, $N_{sat}$ representing the number of satellites visible from the possible position considered, compared to a conventional GNSS procedure and thus provide a better sensitivity and a better precision on the time of passage in current time and the position of the curvilinear abscissa of the detection point exhibiting the maximal correlation peak.

According to one implementation, the propagation errors can be corrected before the summing.

The correlation functions are not all centred exactly around the same moment of passage with the maximum power, since the synchronization deviations between satellite signals received (due in particular to the satellite clocks, to the ionospheric and tropospheric propagation delays, to the multiple paths, etc.) leading to errors in the position of the spatial correlation function. These deviations are of the order of several tens of nanoseconds. If a synchronization deviation of 100 ns (i.e. 30 m over the pseudo-distances) and a vehicle moving at approximately 100 m/s are considered, that is reflected by a dispersion of the positions of the correlation maxima between satellites, obtained by scanning at the speed of the vehicle, over a range of 30/100, i.e. 0.3 s.

To mitigate the effect of this dispersion and therefore the passage determination noise as much as possible, the distances expected from the satellites can be corrected, upon the generation of the local codes, using available error models, (clock error model, tropospheric and ionospheric error models, etc.) to reduce them to a few metres, excluding multiple paths and interferences. These models can for example be supplied by an on board GNSS receiver or via an assistance link.

The point location method according to the invention is therefore based on a detection of virtual beacons placed on the route of the vehicle, which detection is based on a satellite geopositioning performed autonomously on board the vehicle, and without physical infrastructure on the trajectory of the vehicle.

Advantageously, this location method makes it possible to emulate, with a GNSS receiver, a passage detection very similar to what is allowed by a physical beacon, for example using the RFID technique, but without requiring costly infrastructures to be installed and serviced.

For example, in a use in the railway domain, in order to readjust the location device embedded on board the train engine, this point location method makes it possible to remain compatible with the ETCS operating standards concerning the use of the physical RFID beacons.

Furthermore, since the duration of passage of the vehicle in proximity to the virtual beacons is limited, the risk of non-integrity of the GNSS signal during the search for the maximum of the correlation function is reduced, compared to a conventional operation requiring an ongoing tracking of the satellite signals.

At certain virtual beacons, it may be that the number of geopositioning satellites visible is not sufficient to estimate a position.

In this case, the location device aborts the location of the vehicle at this virtual beacon. The readjustment of the odometric means is not performed and will be performed at the next virtual beacon.

In order to take account of the fact that the readjustment has not taken place and therefore of the fact that the error to be corrected will be greater, the positioning device will consider a greater spatial range of uncertainty. It will do the same for the synchronization uncertainty to take account of the trend of the error of synchronization of the local clock 33 of the GNSS receiver with the time base of the geopositioning satellites.

Another subject of the present invention is a point location device for a vehicle moving on a constrained trajectory configured to implement the point location method previously described and to be embedded on board the vehicle to be located.

As has been stated previously, this device comprises a tachometer 32, configured to deliver a signal representative of the current speed of the vehicle and an odometer 31, configured to deliver a signal representative of the displacement of the vehicle.

The device also comprises at least one geopositioning receiver 42 configured to receive and process satellite geopositioning signals.

The device comprises, in addition, a time base 33 synchronized to the GNSS time via the geopositioning receiver 42.

The point location device finally comprises a computation unit comprising one or more computation modules 35, which can consist in one or more computers, and a memory configured in memory areas capable of containing the data or the parameters necessary to the implementation by the computer of the different operations of the method according to the invention.

A computer should be understood here to mean a system comprising one or more microprocessors, processors, computing devices or any other equivalent means, that can be programmed appropriately to implement the different computation operations implemented in the context of the method according to the invention.

Another subject of the present invention is a computer program product comprising computer-readable instructions or instructions readable by any equivalent type of computing device which, when they are executed on a processor, cause the processor to execute the point location method for a vehicle moving on a constrained trajectory as described previously.

The invention claimed is:

1. A point location method for a vehicle moving on a constrained trajectory of known route, said method making it possible to detect the point of passage of the vehicle closest to a predetermined position and being implemented by a location device performing measurements of distance and of speed of the vehicle along the trajectory, and at least one geopositioning receiver receiving positioning signals from at least one satellite of a satellite geopositioning system, and comprising a local time base measuring the current time, synchronized to the time of said satellite geopositioning system, said method comprising:
    a step Etp0, during which use is made of the information on speed and position of the vehicle on its trajectory, supplied by the location device, to estimate, at the current time, the moment of passage closest to said predetermined position ($T_{cpa}$) by taking account of the uncertainties on the time base of the location device;
    a step Etp1, during which several possible moments of passage of the vehicle closest to the predetermined position are estimated, said possible moments being located around the estimated moment of passage closest to said predetermined position ($T_{cpa}$);
    a step Etp2, during which the estimation of the possible positions of the vehicle on the trajectory is performed for each of the possible moments of passage closest to the predetermined position, by taking account of the uncertainties on speed of the vehicle and on position on the trajectory estimated at the current time and extrapolated to the estimated moment of passage of the vehicle closest to the predetermined position ($T_{cpa}$), said possible positions being included in a range of positions centred on the predetermined positon;
    a step Etp3, during which a prediction is made, for each of said possible positions, as to the form of a set of satellite geopositioning signals corresponding to the set of geopositioning signals expected for this position at the corresponding moment;
    a step Etp4, during which, for each possible moment of passage of the vehicle closest to the predetermined position, the spatial match between the expected geopositioning signals and those received by the geopositioning receiver at the current time is tested, by suitable filtering;
    the estimated possible position for which the match is maximal being considered as the point of passage closest to the predetermined position and the corresponding current time as the moment of passage closest to the determined position.

2. The location method according to claim 1, wherein, for each of the possible moments of passage of the vehicle closest to the predetermined position, the spatial match between the geopositioning signals expected for each of the possible positions associated with the possible moment of passage considered and those received by the geopositioning receiver at each current time of the displacement is performed by multiple correlation, said multiple correlation allowing the detection of a correlation peak; the position of passage and the current time for which, after spatial interpolation, the greatest correlation peak is detected, being considered as the point of passage and the moment of passage closest to the predetermined position.

3. The location method according to claim 1, comprising an additional step of readjustment of the odometry means of the location device embedded on board the vehicle, the readjustment being performed by considering the deviation between the position of the point of passage closest to the predetermined position and the position delivered by the odometry means corresponding to the current time determined as being the moment of passage closest to the predetermined position.

4. The point location device for a vehicle moving on a constrained trajectory of known plot comprising:
    tachometry means configured to deliver a signal representative of the speed of the vehicle along said constrained trajectory,
    odometry means configured to deliver a signal representative of the displacement of the vehicle along said constrained trajectory,
    at least one geopositioning receiver configured to receive and process satellite geopositioning signals,
    a time base, measuring the current time, synchronized to the GNSS time via the geopositioning receiver,
    at least one computation module configured to implement a paint location method according to claim 1 by using the data supplied by the tachometry and odometry means and by the geopositioning receiver.

5. The point location device according to claim 4, wherein said device is configured to implement the point location method when the distance between the vehicle and the predetermined position considered is below a predetermined given value.

6. A computer program product comprising computer-readable instructions which, when they are executed on a processor, cause the processor to execute the method according to claim 1.

* * * * *